United States Patent [19]

Ishikawa et al.

[11] Patent Number: 4,969,422
[45] Date of Patent: Nov. 13, 1990

[54] BREATHER SYSTEM FOR A BALANCER GEAR CHAMBER OF A TWO-CYCLE ENGINE

[75] Inventors: Hideyuki Ishikawa, Ohmiya; Fusao Tachibana, Saitama, both of Japan

[73] Assignee: Fuji Jukogyo Kabushiki Kaisha, Tokyo, Japan

[21] Appl. No.: 411,307

[22] Filed: Sep. 22, 1989

[30] Foreign Application Priority Data

Sep. 26, 1988 [JP] Japan .................. 63-125242[U]

[51] Int. Cl.⁵ ............................................. F01M 13/00
[52] U.S. Cl. .............................. 123/41.86; 123/196 R
[58] Field of Search ................. 123/41.86, 572, 573, 123/574, 196 R, 196 CP

[56] References Cited

U.S. PATENT DOCUMENTS

| | | | |
|---|---|---|---|
| 2,902,012 | 9/1959 | Malcolm | 123/41.86 |
| 4,103,650 | 8/1978 | Nishida et al. | 123/41.86 |
| 4,465,029 | 8/1984 | Matsumoto | 123/192 B |
| 4,825,818 | 5/1989 | Hamamura et al. | 123/90.31 |
| 4,836,156 | 6/1989 | Inagaki et al. | 123/90.31 |
| 4,846,124 | 7/1989 | Suzuki et al. | 123/192 B |

FOREIGN PATENT DOCUMENTS

| | | | |
|---|---|---|---|
| 1256476 | 12/1967 | Fed. Rep. of Germany ... | 123/41.86 |
| 0204910 | 11/1983 | Japan | 123/41.86 |
| 60-27765 | 8/1985 | Japan . | |

*Primary Examiner*—David A. Okonsky
*Attorney, Agent, or Firm*—Martin A. Farber

[57] ABSTRACT

A two-cycle engine has a balancer shaft driven by a crankshaft of the engine through gears, and a gear cover forming a balancer gear chamber for the gears. The balancer gear chamber is communicated with the atmosphere through a breather passage formed in an upper portion thereof. A labyrinth passage is formed in the balancer gear chamber for breathing air, so as to separate oil from discharging air.

4 Claims, 4 Drawing Sheets

BREATHER SYSTEM FOR A BALANCER GEAR CHAMBER OF A TWO-CYCLE ENGINE

BACKGROUND OF THE INVENTION

The present invention relates to a breather system for a two-cycle engine for adjusting the air pressure in a balancer gear chamber.

Some types of a two-cycle engine have a balancer chamber for housing gears and balancers. The balancer chamber is sealed with a sealing means and has an oil reservoir formed therein The oil in the oil reservoir is scooped up by balancer gears provided in the balancer chamber to lubricate the gears and bearings.

When the temperature of the engine rises after starting the engine or when the temperature drops after stopping the engine, the inner pressure in the balancer chamber varies. The pressure variation affects the sealing of the balancer chamber. To prevent the reduction of the sealing effect, a breather device is provided for adjusting the inner pressure.

Japanese Utility Model Publication 60-27765 discloses a breather system in which a breather chamber is formed on an upper portion of a balancer chamber The breather chamber is provided with a fine drill hole to communicate the breather chamber with the atmosphere through a tapped hole of a bolt provided for engaging a crankcase and a cylinder block. When the air in the balancer chamber expands and flows into the breather chamber, the oil included in the air is almost separated from the air in the breather chamber. Thereafter, the air passes through the drill hole where the oil is further separated from the air and the air discharges into the atmosphere through the tapped hole.

However, in the system, the air flowing into the breather chamber includes a large amount of oil. Therefore, it is necessary to provide a breather chamber having a large capacity to separate the oil from the air. Further, the manufacturing cost of the device increases because of forming a fine drill hole.

SUMMARY OF THE INVENTION

The object of the present invention is to provide a breather system for a two-cycle engine which may effectively separate oil from air with a device having a small size.

According to the present invention, there is provided a breather system for a two-cycle engine having a balancer shaft rotatably supported in a crankcase of the engine and driven by a crankshaft of the engine through gears.

The system comprises a gear cover secured to the crankcase to form a balancer gear chamber for the gears and form an oil reservoir in a lower portion thereof, either of the crankcase or gear cover having a breather passage in upper portion thereof a breather chamber, an oil separating member hanging down from an upper wall of the balancer gear chamber into the breather chamber to form a portion of said breather passage by forming a labyrinth passage for breathing air.

In an aspect of the present invention, the breather passage includes breather chambers, and the oil separating member is formed by extending a gasket disposed between the crankcase and the gear cover.

The other objects and features of this invention will become understood from the following description with reference to the accompanying drawings.

DETAILED DESCRIPTION OF THE PREFERRED EMBODIMENT

Figure 1:
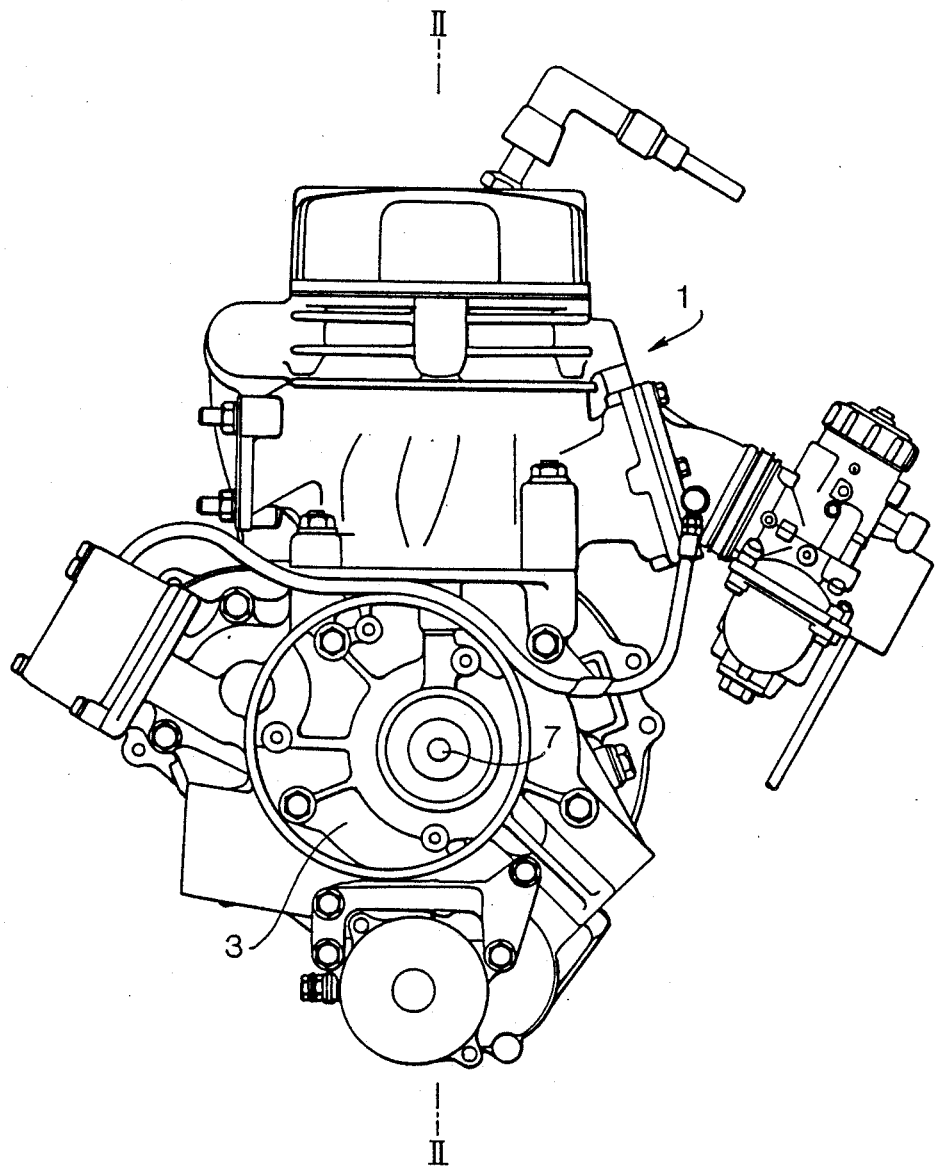
FIG. 1 is a front view of an engine to which a breather system according to the present invention is applied.
Figure 2:
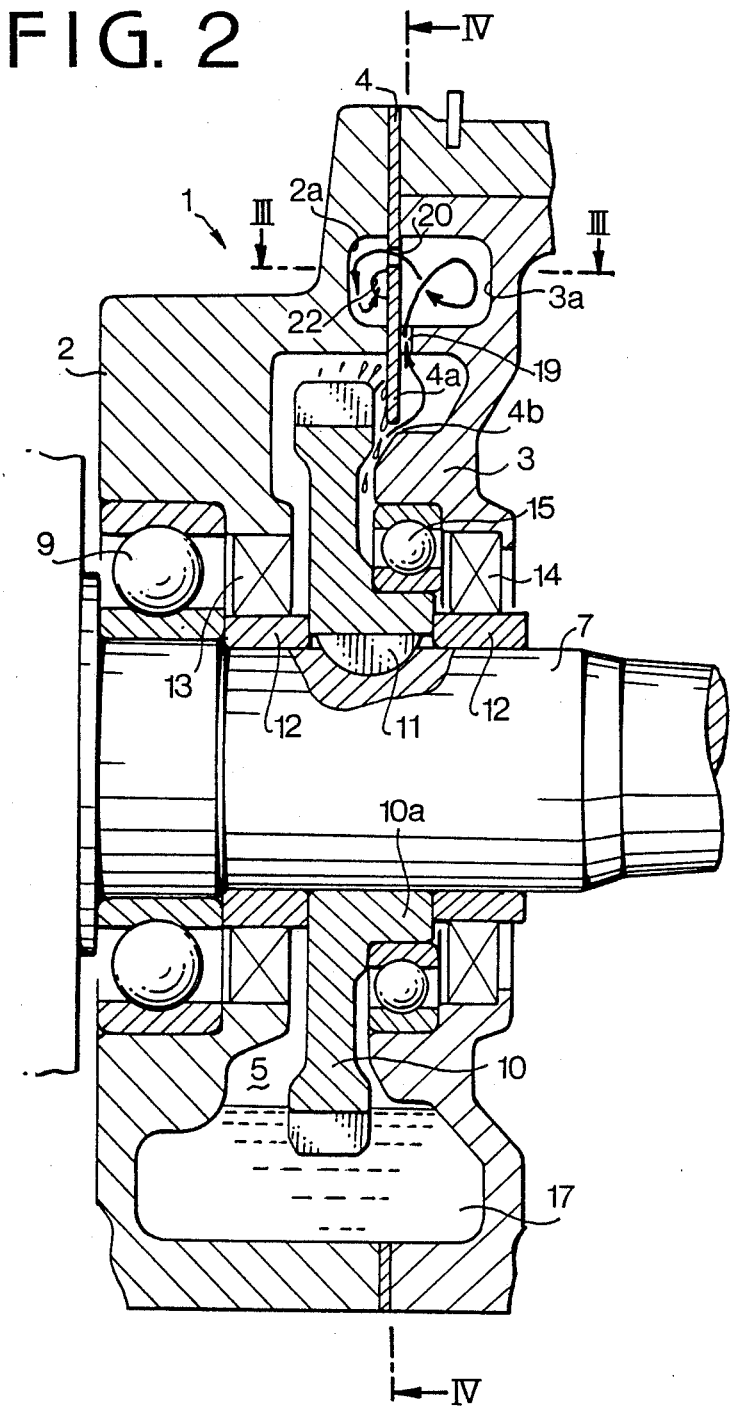
FIG. 2 is a sectional view taken along a line II—II of FIG. 1.
Figure 3:
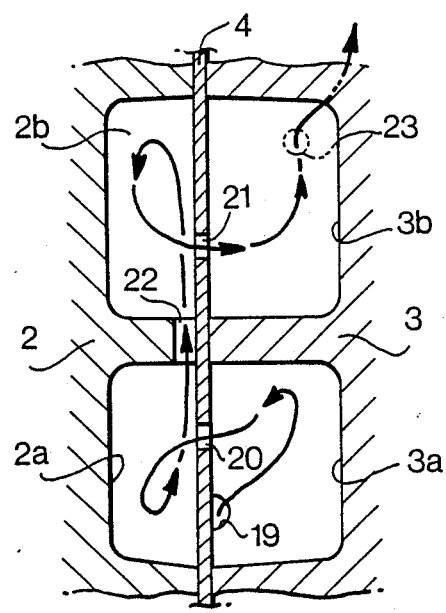
FIG. 3 is a sectional view taken along a line III—III of FIG. 2.

Referring to FIGS. 1 to 4, a two-cycle engine 1 has a crankcase 2 and a gear cover 3 secured to the crankcase 2 through a gasket 4, thereby defining a balancer gear chamber 5. A crankshaft 7 of the engine 1 extends to the outside of the gear cover 3 through the balancer gear chamber 5. A balancer shaft 8 is provided in parallel with the crankshaft 7.

A main journal of the crankshaft 7 is rotatably mounted in the crankcase 2 through a main bearing 9. A balancer drive gear 10 is mounted on the crankshaft 7, disposed in the balancer gear chamber 5 and secured to the crankshaft 7 by a key 11. A boss 10a of the balancer drive gear 10 is mounted in the gear cover 3 through a bearing 15. A pair of collars 12 are securely mounted on the crankshaft 7 at both sides of a hub of the balancer drive gear 10. The inside collar 12 is abutted on the main bearing 9 and mounted in the crankcase 2 through a sealing member 13. The outside collar 12 is mounted in the gear cover 3 through a sealing member 14.

The balancer shaft 8 is mounted in the crankcase 2 and the gear cover 3 in the same manner as the crankshaft 7. A balancer driven gear 16 is mounted on the balancer shaft 8 and meshed with the balancer drive gear 10. The balancer shaft 8 extends to the inside of the crankcase 2 and a balancer (not shown) is mounted on the balancer shaft 8 in the inside of the crankcase 2.

At the bottom of the balancer gear chamber 5, an oil reservoir 17 is formed to reserve a predetermined amount of oil. An oil inlet 18 for the oil reservoir 17 is formed in the gear cover 3.

Figure 4:
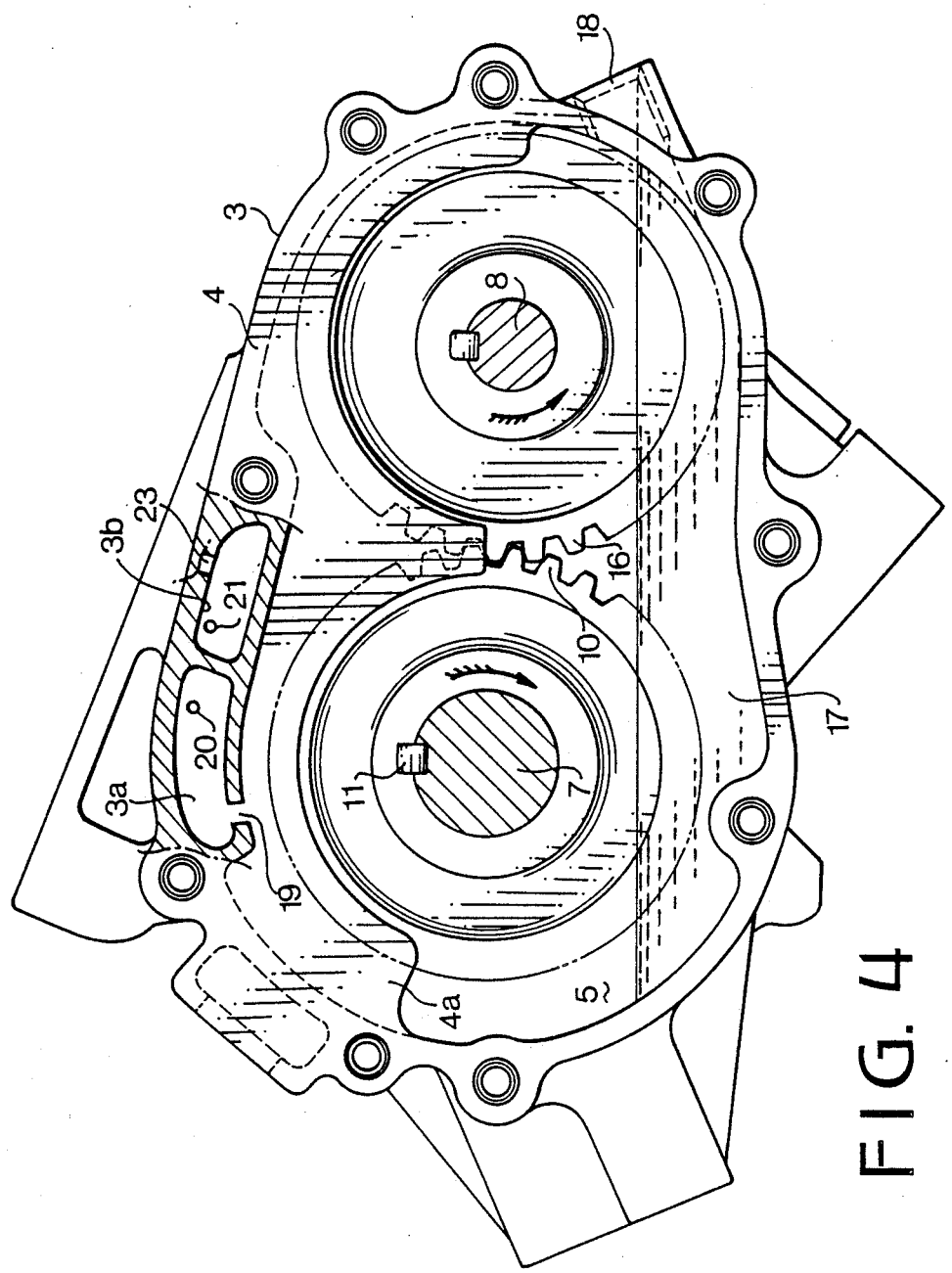
FIG. 4 is a sectional view taken along a line IV—IV of FIG. 2.

As shown in FIG. 4, the gasket 4 has a peripheral projection to form an oil separating member 4a which hangs down along the outside of the balancer drive gear 10 and the balancer driven gear 16 to form a labyrinth air passage 4b.

At an upper portion of the balancer gear chamber 5, the crankcase 2 has adjacent breather chambers 2a and 2b defined by recesses formed in the crankcase 2 and the gasket 4. The gear cover 3 also has adjacent breather chambers 3a and 3b formed in the gear cover 3, corresponding to the breather chamber 2a and 2b and sealed with the gasket 4. The gear cover 3 has a breather passage 19 vertically formed to communicate the breather chamber 3a with the balancer gear chamber 5. The gasket 4 has a port 20 to communicate the breather chamber 3a with the breather chamber 2a and a port 21 to communicate the breather chamber 2b with the breather chamber 3b. A port 22 is formed in the crank case 2 to communicate the breather chamber 2a with the breather chamber 2b. The breather chamber 3b communicates with the atmosphere through a port 23.

Describing the operation of the system, the balancer driven gear 16 is driven by the balancer drive gear 10 to rotate the balancer on the balancer shaft 8 in the counter direction to the crankshaft.

The oil in the oil reservoir 17 is scooped up by rotating gears 10 and 16 to lubricate the gears and bearings. The scooped oil collides with the oil separating member 4a and the inner walls of the balancer gear chamber 5 and drops.

As the temperature rises after starting the engine, the air in the balancer gear chamber 5 expands and enters the breather passage 19 around the peripheral projection 4a. Since the air passes the labyrinth passage 4b, the oil in the air is separated from the air upon collision with the projection 4a so that only the air enters the breather passage 19. Then the air flows into the breather chamber 3a, and further into the breather chamber 2a through the port 20. Furthermore, the air passes to the breather chamber 2b through the port 22, and to the breather chamber 3b through the port 21 as shown by arrows in FIG. 2. Finally, the air discharges into the atmosphere through the port 23. When passing through the breather passage 19, breather chambers 3a, 2a, 2b and 3b, and ports 20, 22 and 21, a mist of oil which slightly remains in the air is further separated from the air.

Therefore, oil is not discharged into the atmosphere through the port 23. Thus, the wall around the port 23 is not stained.

When the temperature drops after stopping the engine, the air in the balancer gear chamber 5 contracts. The atmosphere is induced into the balancer gear chamber 5 accordingly.

An oil drain port may be provided in each breather chamber for draining the oil in the breather chamber.

From the foregoing, it will be understood that the present invention provides a breather system in which oil is effectively separated from air so that the oil is prevented from being discharged. The system is simple in structure and light in weight. The system has high workability, so that the manufacturing process is simplified.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A breather system for a two-cycle engine having a balancer shaft rotatably supported in a crankcase of the engine and driven by a crankshaft of the engine through gears, the system comprising:

a gear cover secured to the crankcase to form a balancer gear chamber for said gears and form an oil reservoir in a lower portion thereof;

either of said crankcase or gear cover having a breather passage in an upper portion thereof, a breather chamber communicating said balancer gear chamber with the atmosphere;

an oil separating member hanging down from an upper wall of the balancer gear chamber and through the breather chamber to form a portion of said breather passage by forming a labyrinth passage for breathing air.

2. The system according to claim 1, wherein the breather passage includes breather chambers.

3. The system according to claim 1, wherein said oil separating member is formed by extending a gasket disposed between the crankcase and the gear cover.

4. The system according to claim 2, wherein each said breather chamber is communicated with the adjacent chamber through a port.

* * * * *